United States Patent
Williamson et al.

(10) Patent No.: US 10,351,260 B2
(45) Date of Patent: Jul. 16, 2019

(54) AIRCRAFT HANDLING SYSTEM

(71) Applicant: MacTaggart Scott (Holdings) Limited, Midlothian (GB)

(72) Inventors: Cameron Williamson, Edinburgh (GB); Lee Baines, Rosewell (GB); Alistair Plowman, Livingston (GB)

(73) Assignee: MACTAGGART SCOTT (HOLDINGS) LIMITED, Midlothian (GB)

( * ) Notice: Subject to any disclaimer, the term of this patent is extended or adjusted under 35 U.S.C. 154(b) by 109 days.

(21) Appl. No.: 15/699,639

(22) Filed: Sep. 8, 2017

(65) Prior Publication Data

US 2019/0077518 A1   Mar. 14, 2019

(51) Int. Cl.
  *B64F 1/08*   (2006.01)
  *B64F 1/12*   (2006.01)
  *B64F 1/22*   (2006.01)

(52) U.S. Cl.
  CPC .............. *B64F 1/08* (2013.01); *B64F 1/125* (2013.01); *B64F 1/22* (2013.01); *B63B 2708/00* (2013.01)

(58) Field of Classification Search
  CPC ... B66D 1/26; B66D 1/40; B66D 1/48; B66D 1/50; B66D 1/52
  See application file for complete search history.

(56) References Cited

U.S. PATENT DOCUMENTS

| | | | |
|---|---|---|---|
| 1,816,010 A * | 7/1931 | Gros | B64F 1/14 244/116 |
| 3,612,486 A | 10/1971 | Martin et al. | |
| 4,488,693 A | 12/1984 | Brandt et al. | |
| 4,608,964 A * | 9/1986 | Russo | F24S 23/715 126/688 |
| 5,098,035 A | 3/1992 | Bernard et al. | |
| 9,302,190 B1 * | 4/2016 | Jennings | A63J 5/00 |
| 2013/0087751 A1 * | 4/2013 | Kwon | B66D 1/48 254/268 |
| 2013/0238135 A1 * | 9/2013 | Fisher | B66C 21/00 700/275 |
| 2015/0134152 A1 * | 5/2015 | Coram | G01N 33/0098 701/3 |

(Continued)

FOREIGN PATENT DOCUMENTS

GB   1 272 803 A   5/1972

OTHER PUBLICATIONS

PCT International Search Report dated Nov. 19, 2018 in connection with PCT International Patent Application No. PCT/GB2018/052542.

*Primary Examiner* — Emmanuel M Marcelo
(74) *Attorney, Agent, or Firm* — Amster, Rothstein & Ebenstein LLP

(57) ABSTRACT

A system for handling an aircraft on a nautical vessel includes a plurality of winches each associated with a corresponding one of a plurality of electromotors and a plurality of cables associated with the plurality of winches. Each of the plurality of cables is configured to attach to an aircraft positioned on a deck of the nautical vessel. A control system is configured to receive a target aircraft hauling speed and direction and operate the winches to achieve the target speed in the selected direction while maintaining load on the aircraft to below a maximum limit and also maintaining the cables in tension.

5 Claims, 4 Drawing Sheets

(56) References Cited

U.S. PATENT DOCUMENTS

| | | | | |
|---|---|---|---|---|
| 2015/0320632 A1* | 11/2015 | Vallery | .................. | A61H 3/008 |
| | | | | 482/69 |
| 2017/0240277 A1* | 8/2017 | Molnar | ................. | B64C 39/022 |
| 2017/0297683 A1* | 10/2017 | Hovan | .................... | B64F 1/221 |
| 2018/0002648 A1* | 1/2018 | Moore | ....................... | C12C 7/04 |
| 2018/0118534 A1* | 5/2018 | Hall | ........................ | B66D 3/26 |
| 2018/0221778 A1* | 8/2018 | Blum | .................... | A63G 31/02 |

* cited by examiner

AIRCRAFT HANDLING SYSTEM

TECHNICAL FIELD

The present invention relates to aircraft handling systems, and in particular to aircraft handling systems for the deck handling of helicopters on nautical vessels.

BACKGROUND

A fixed deck of a ship may be provided with a hangar for receiving and storing of a helicopter or other aircraft. It is known to provide a system of winches that are hydraulically driven to maneuver the helicopter from a helicopter pad to the hangar. However, due to the nature of hydraulics and associated control systems, known aircraft handling systems have built-in lag times that do not effectively compensate for rapid changes in cable tensions and associated loads on the aircraft. This issue is particularly critical in the case of adverse sea conditions.

SUMMARY OF THE INVENTION

A system for handling an aircraft on a nautical vessel according to an exemplary embodiment of the present invention comprises: a plurality of winches each associated with a corresponding one of a plurality of electromotors; a plurality of cables associated with the plurality of winches, each of the plurality of cables configured to attach to an aircraft positioned on a deck of the nautical vessel; and a control system configured to operate as follows: receive a target aircraft hauling speed; vary, by the plurality of electromotors, torque applied to one or more hauling winches among the plurality of winches to achieve a target aircraft hauling speed; determine load on the aircraft based on the torque applied to the one or more hauling winches and torque applied to one or more rendering winches among the plurality of winches; determine, based on the detected load, target rendering torques for each of the one or more rendering winches that maintains the detected load below an aircraft maximum load limit and that maintains a predetermined tension in the cables corresponding to the one or more rendering winches; vary, by the plurality of electromotors, speed of the rendering winches to achieve the target rendering torques for each of the rendering winches; and vary, by the plurality of electromotors, torque of the rendering winches to maintain the predetermined tension.

In an exemplary embodiment, the controller is further configured to determine the torque applied to the one or more hauling winches and the torque applied to the one or more rendering winches based on winding temperature, motor speed and drawn current of each respective winch.

In an exemplary embodiment, the controller is further configured to determine tension in the cables corresponding to the one or more rendering winches based on the determined torque and wire layer height of each respective rendering winch.

In an exemplary embodiment, the controller is further configured to determine wire layer height based on a spooled wire length of each respective rendering winch.

In an exemplary embodiment, the system further comprises a control console through which the target aircraft hauling speed is entered into the system by a user.

These and other features and advantages of the present invention will be presented in more detail in the following detailed description and the accompanying figures which illustrate by way of example principles of the invention.

BRIEF DESCRIPTION OF THE DRAWINGS

Various exemplary embodiments of this invention will be described in detail, with reference to the following figures, wherein.

DESCRIPTION OF PREFERRED EMBODIMENTS OF THE INVENTION

Figure 1:
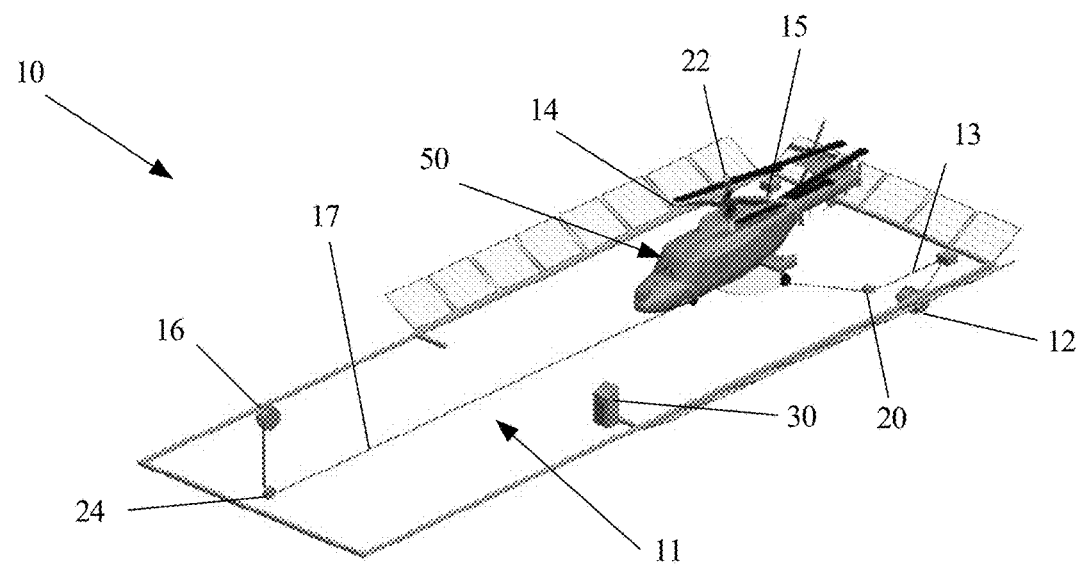
FIG. 1 is an illustration of a 3-wire aircraft handling system according to an exemplary embodiment of the present invention.
Figure 2:
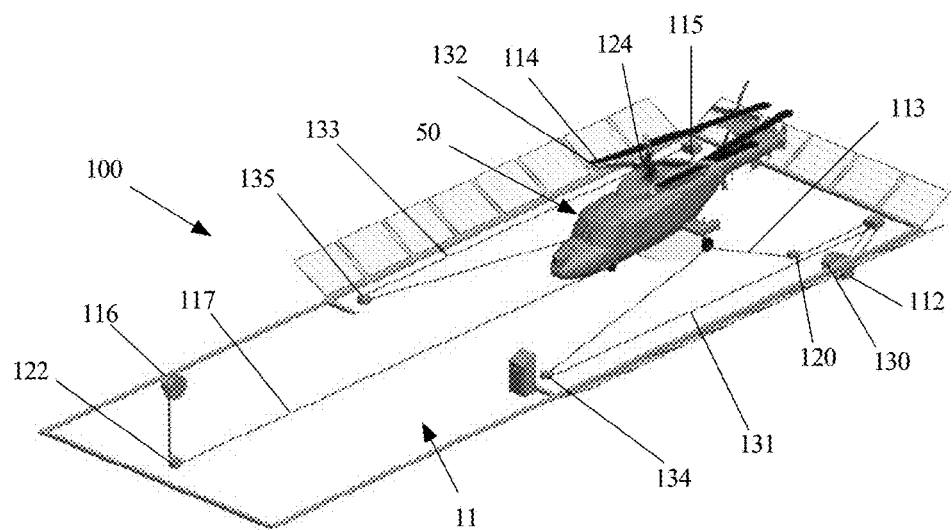
FIG. 2 is an illustration of a 5-wire aircraft handling system according to an exemplary embodiment of the present invention.

FIGS. 1 and 2 illustrate aircraft handling systems according to exemplary embodiments of the present invention. Specifically, FIG. 1 shows a 3-wire aircraft handling system, generally designated by reference 10, according to an exemplary embodiment of the present invention, and FIG. 2 shows a 5-wire aircraft handling system, generally designated by reference 100, according to an exemplary embodiment of the present invention.

The 3-wire system 10 comprises three electromechanical winches, with two of the winches (first winch 12 and second winch 14) located aft, and a third winch 16 located high up on the forward bulkhead of a hangar. The first winch 12 may be located at the port-side and the second winch 14 may be located at the starboard-side of the ship deck. First and second winches 12, 14 may be mounted under deck 11 with associated first and second wires 13, 15 coming on to deck level round sheaves 20, 22. The third winch 16 may be located high up on the forward bulkhead of a hangar with associated third wire 17 being led down to deck level and around a sheave 24. The first and second wires 13, 15 are intended for attachment to the rear of the aircraft 50 and the third wire 17 is intended for attachment to the front of the aircraft 50. It should be appreciated that the location of the various components of the aircraft handling systems 10, 100 is not limited to the configuration shown in the drawings or otherwise described herein. For example, the location of the winches may be at any point along the deck because the sheaves are used to ensure the wire load path across the deck is correct.

A control console 30 may be situated close to the hangar door or at another location so that an operator may have optimum viewing of the aircraft and associated maneuvering. The control console 30 is operatively connected to the first, second and third winches 12, 14, 16 so that an operator may adjust input devices (e.g., a joystick or graphical user interface) at the control console 30 to generate control signals to be sent to the first, second and third winches 12, 14, 16. Each winch 12, 14, 16 may include components such as, for example, an absolute angle encoder, a holding brake, an AC permanent magnet motor, a three stage planetary reduction gearbox, a drum (optionally, a grooved drum) and a casing, to name a few. In an exemplary embodiment, the motor is a 16-pole permanent magnet, three phase motor, having a design speed of 1250 RPM.

The 5-wire system includes the same components as the 3-wire system, including first, second and third winches 112, 114, 116, associated wires 113, 115, 117, and associated sheaves 120, 122, 124. In addition, the 5-wire system includes two restraining winches 130, 132 positioned adjacent to the first and second winches 112, 114, but with the winch line attachment made so as to provide a near constant pull. Specifically, a fourth wire 131 associated with the first restraining winch 130 extends around a sheave 134 and connects with a rear portion at one side of the aircraft, and a fifth wire 133 associated with the second restraining winch 132 extends around a sheave 135 and connects with a rear portion at another side of the aircraft.

Figure 5:
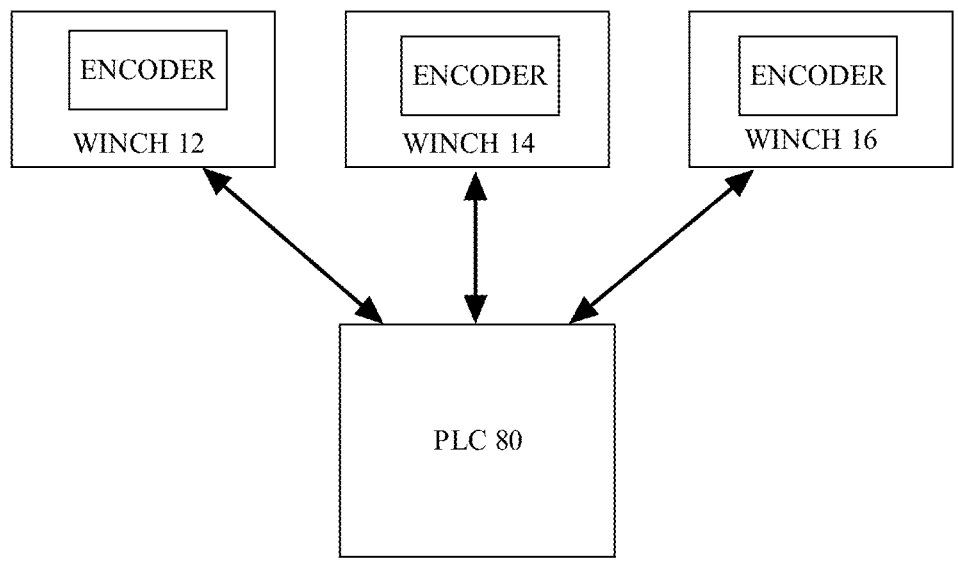
FIG. 5 is a block diagram of an aircraft handling system according to an exemplary embodiment of the present invention.

As shown in FIG. 5, the control of the systems 10, 100 is managed by a Programmable Logic Controller (PLC) 80, with some areas of functionality being controlled by the three motor drives. The PLC 80 may communicate with the three (or five) drives via a deterministic network protocol (such as, for example, an Ethernet-based deterministic network protocol) allowing for safety critical data to be handled correctly. The system 10, 100 relies on feedback from the drives in the form of motor speed (taken from the absolute encoders mounted inside the winch) and current being consumed by the motors. Drum speed, wire speed and theoretical aircraft position can then be calculated. The winch torque is a function of speed, current draw and winding temperature. An algorithm based on this relationship may be implemented in the control system to provide a reliable line tension, using the absolute encoder data to track the idealized position of the winch cable on the drum, and therefore the effective torque arm. This is then used to calculate the line tension, within a tolerance band to account for spooling errors. This algorithm can function as either a polynomial equation or a three-dimensional look-up table.

In an exemplary embodiment of the invention, the torque on each winch is calculated to a reasonable accuracy by the respective drive, which uses the current drawn and speed recorded by the encoder. This figure is then refined by the PLC, which also takes into account the temperature, as well as current and speed. The torque constant may be calculated using the back EMF, but should be measured for each motor to give the highest accuracy to the system. The following formula may be used to calculate the torque on each winch:

Torque=Current×Torque Constant×Temperature× Temperature Scaler

In the above formulation, "Temperature" refers to the winding temperature and the "Temperature Scaler" coefficient is a variable that compensates for changes in winding resistance due to temperature. The "Temperature Scaler" is motor dependent, and thus is calculated for each system.

The PLC then uses this torque calculation, in combination with the absolute encoder rotation count to find an accurate value for the line tension on each winch. The three line tensions are then combined using the sum of their vectors to produce an estimated load on the helicopter landing gear. Specifically, tension of each wire may be calculated as follows:

Tension=Torque×Wire Layer Height, where

Wire Layer Height=(Spooled Wire±x)×Layer Adjuster

In the above formulation, "Spooled wire" refers to the length of the spooled wire or rope which is currently stored on the drum. The tolerance value "x" is an adjustment to the spooled wire length by adding or subtracting a length of wire, resulting in a low and high number, describing the range in which the rope is expected to be within. The tolerance value is experimentally determined. Due to the length tolerance value "x" having two values, "Wire layer height" can also have two values. The control system will use the higher or lower value depending on the specific situation (the worst-case option is preferably selected). "Layer adjuster" refers to the calculation which uses the spooled wire length to find the layer that the rope is up to (i.e., the current layer). Due to the fact there are two values input at this stage, there may be an upper and lower layer level, depending on the accuracy of the system. According to an exemplary algorithm, the layer height is determined as follows:

if(spooled wire ≤Layer 1 cut-off)
   layer height=layer 1 height
else if((spooled wire>Layer 1 cut-off) AND (spooled wire-≤Layer 2 cut-off))
   layer height=layer 2 height
else if((spooled wire>Layer 2 cut-off) AND (spooled wire-≤Layer 3 cut-off))
   layer height=layer 3 height
else if((spooled wire>Layer 3 cut-off) AND (spooled wire-≤Layer 4 cut-off))
   layer height=layer 4 height
else if((spooled wire>Layer 4 cut-off) AND (spooled wire-≤Layer 5 cut-off))
   layer height =layer 5 height
else if((spooled wire >Layer 5 cut-off) AND (spooled wire-≤Layer 6 cut-off))
   layer height =layer 6 height Before commencing movement operations, the user may either select the helicopter they intend to move from a prepared selection of helicopter profiles, or by manually entering the required data. This data includes the mass and loading limits of the aircraft, which is then used to determine torque and speed limits. The profile selection process generates tailored speed and torque limits, allowing for control in the widest range of situations, while optimizing for minimal airframe fatigue. If the system detects that it will be unable to control the helicopter while remaining within these boundaries, it will slow and stop the helicopter, then apply the winch brakes to prevent any potential damage.

During helicopter handling operations the three (or five) wires are kept taught at all times, meaning the helicopter is always under control. To ensure this, the hauling winch (or winches) is speed-controlled, using variable torque (up to the helicopter specific safe limit) and the rendering winches (or winch) are torque-controlled, using variable speed to maintain a constant line tension.

This helicopter handling control method functions without issue when moving from deck to hangar, however when deploying a helicopter from hangar to deck an additional control method is preferably employed to prevent slack wire. This is due to multiple winches being effectively synchronized in speed control, while the helicopter may be steered either by crew intervention or ship's motions. The result is a delta between the combined winch vectors and the actual helicopter position. This is corrected for by monitoring the torque difference between the two winches and then allowing a speed difference if either is applying a sufficiently low torque. This method of control means that the helicopter should be held safely between 3 or 5 wires at controlled tensions.

Maintaining the position of the line on the winch drum is important for good performance of the system. If the drums are rotated without a load on their lines they can become twisted and uneven. To counter this, in accordance with an exemplary embodiment of the invention, a method of paying out the lines may be used in which the drums only rotate when sufficient external force is applied by a user pulling the line. This is achieved by providing the torque required to overcome the gearbox inertia and no more. The supplied torque is then adjusted for the speed of rotation, to ensure it will detect when the line is released. This enables a single user to haul lines onto the helicopter at the beginning of operations as well as ensuring back tension is maintained.

When it is required to move a helicopter from the hangar to the landing deck, the wires 13, 15, 17 from the winches 12, 14, 16 respectively are payed out and attached to strong points on the helicopter suspension system. A joystick control lever (or other input device) of the control console 13 is then displaced from a central position to release the winch brakes and the three wires 13, 15, 17 are automatically tensioned. The control lever is then placed in the required direction of helicopter movement i.e. towards the landing area thereby causing the two aft winches 12, 14 to haul with the hangar winch 16 providing back tension. Further movement of the control lever adjusts the speed. The helicopter can be manipulated within the framework provided by the three deck sheaves 20, 22, 24 such that one winch can haul (operating as the hauling winch) with two providing back tension (operating as the rendering winches) or two winches hauling (operating as the hauling winches) and one providing back tension (operating as the rendering winch).

When moving the helicopter into the hangar, back tension supplied by the aft winches 12, 14 is automatically adjusted so that the total forces on the helicopter are within a maximum value. When the hangar winch is hauling with a high load, the back tension or render value of the two aft winches 12, 14 will be small. When the hangar winch hauling load is reduced due to pitching, the render load from the two aft winches 12, 14 is increased automatically to give the correct balance of forces. In this manner the total load applied to the helicopter is reduced to a minimum while the correct net hauling load is adjusted to an optimum value. If the joystick is allowed to return to the neutral position, the brakes on the winches are immediately applied and the helicopter will cease to move.

The control sequence may be described by following an aircraft from deck to hanger focusing purely on the actual movement of the aircraft. Initially, the operator selects an operating mode and aircraft profile, i.e. define the type of aircraft to be moved. Doing so calls up appropriate limits within the software. The operator defines the direction; in this case towards hanger. The operator uses the interface (e.g., single axis joystick) to define the target speed for the movement. This is the speed at which the hanger winch will aim to haul. At this point the control system is monitoring and correcting as follows:

1. Increase torque available to the hanger winch so as to accelerate towards target speed, without exceeding torque limit;

2. Apply torque to deck winches (rendering winch(es)) based on system limits and haul winch actual demand.

a. If render winch torque is below target, increase speed until target is reached Assuming the vessel is at rest, once the aircraft has reached the target velocity (i.e. target speed and the direction is steady) the line load will remain constant. Torque will slowly increase at the hauling motor as the number of layers of rope on the drum increase, increasing the effective lever arm. Ignoring this the system will reach a steady state. Torque in the hauling winch will be the minimum to maintain the target speed. Torque in the rendering winches will be maintained just above a lower limit to ensure a "nominal" tension across the airframe.

Figure 3:
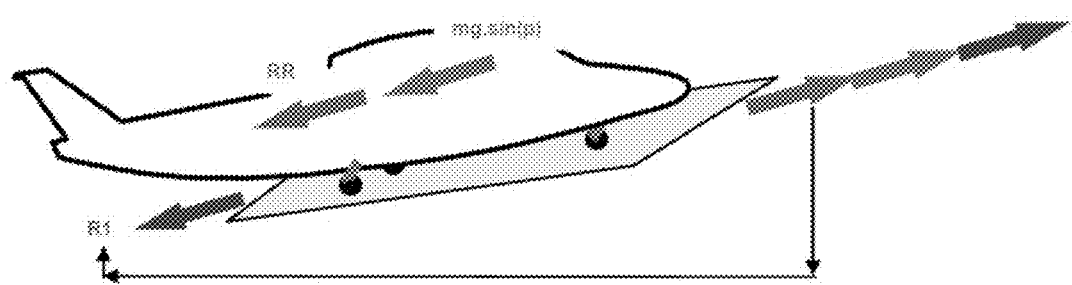
FIG. 3 is a diagram showing an aircraft on a pitched deck of a nautical vessel.

If the vessel is not at rest, i.e. at sea, the demand will change and will be related to the vessels attitude and the rate of change of the vessels attitude. In simple terms, as shown in FIG. 3, if the vessel pitches up at the bow, there will be a positive, uphill gradient towards the hanger. The torque at the hauling winch required to maintain the aircraft velocity will increase, and may be represented as follows:

$$\text{Demand on hanger winch} = RR + mg.\sin(p) + R1,$$

where RR is the rolling resistance, R1 is the total line tension in the rendering winch(es) and mg.sin(p) is acceleration due to gravity.

This same control algorithm may be applied to manage any combination of ships motions. Ultimately this will be limited by the allowable load across the airframe between the hauling and rendering winches. This correlates to the preset torque limit. Once this torque limit is reached the algorithm can be programmed to respond in two main ways:

1. Continue to aim for a target speed while obeying the torque limit. This may in extreme circumstances result in a negative speed.

2. As speed tends to zero holding brakes on all winches are applied maintaining the residual line tension.

a. State one can be observed until the hauling winch veers, at which point brakes can be applied.

Figure 4:
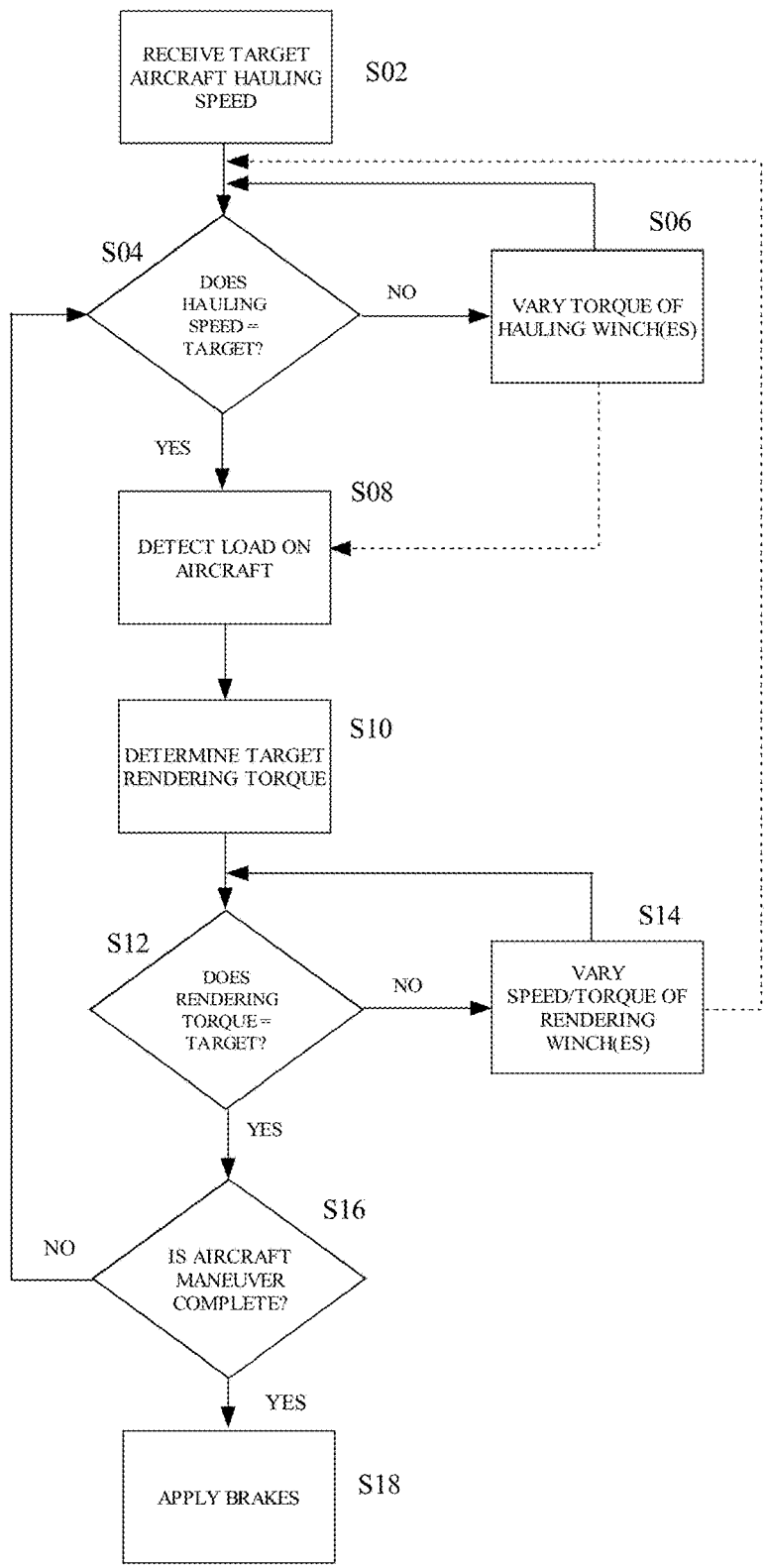
FIG. 4 is a flowchart showing a control algorithm of an aircraft handling system according to an exemplary embodiment of the present invention.

FIG. 4 is a flowchart showing a control algorithm of an aircraft handling system according to an exemplary embodiment of the present invention. In order to initiate an aircraft maneuver, the operator may select a "helicopter handling" operation from the GUI at the control console 13, select a direction (e.g., "to hangar") and begin adjustment of the target speed using the joystick (step S02). The winch brakes may then be released and holding tension applied to all winches. At step S04, the controller determines whether the hauling speed is equal to or within a tolerance limit of the target hauling speed. If no, control proceeds to step S06, where the torque of the hauling winch(es) is varied as necessary to achieve the target speed. For example, if the hauling speed is too low, the torque of the hauling winch(es) is adjusted to a higher value to increase the hauling winch speed.

The variation in torque generated by the hauling winch(es) may result in an increase in load on the aircraft, and in some cases this may result in the load approaching a maximum value beyond which the aircraft may be susceptible to damage. Thus, in the case where the hauling speed has reached the target hauling speed and/or the torque of the hauling winch(es) has been varied in an attempt to reach the target hauling speed, control proceeds to step S08 (the controller may simultaneously continue to make adjustments to the hauling winch(es) torque to achieve hauling speed, as indicated by the dashed arrow), where load on the aircraft is detected. Load on the aircraft may be determined by summing the actual line load vectors of the winches, where the line load vector for each winch is proportional to motor torque and wire rope position on the winch drum. Then, in step S10, a target rendering torque at the rendering winch(es) is determined based on the detected load on the aircraft to minimize aircraft load and in any case maintain the load below a maximum safe value. The process then proceeds to step S12, where the controller determines whether the rendering torque at the rendering winch(es) equals or is within a specified tolerance limit of the target rendering torque. If no, then in step S14, the speed of the rendering winch(es) is varied as necessary to achieve the target rendering torque, and simultaneously, the controller continues to control the hauling winch(es) to achieve the hauling speed (as indicated by the dashed arrow). In this step, the torque of the rendering winch(es) may also be controlled to ensure that the rendering wire(s) remain under tension. That is, the control algorithm makes adjustments as necessary, balancing the rendering torque and speed adjustments, to ensure that load on the aircraft is minimized and kept below a maximum value while keeping the rendering wires under tension. In this way, the helicopter can be maintained under control during the maneuver even in the case of a pitched deck.

In step S16, the controller determines if the maneuver is complete. For example, the operator may release the joystick to a neutral position, indicating that the target speed is zero and the aircraft has reached its target destination. If the maneuver is complete, control proceeds to step S18, where the winch brakes are applied to secure the aircraft.

Now that the preferred embodiments of the present invention have been shown and described in detail, various modifications and improvements thereon will become readily apparent to those skilled in the art. Accordingly, the spirit and scope of the present invention is to be construed broadly and not limited by the foregoing specification.

What is claimed is:

1. A system for handling an aircraft on a nautical vessel, comprising:
   a plurality of winches each associated with a corresponding one of a plurality of electromotors;
   a plurality of cables associated with the plurality of winches, each of the plurality of cables configured to attach to an aircraft positioned on a deck of the nautical vessel; and
   a control system configured to operate as follows:
      receive a target aircraft hauling speed;
      vary, by the plurality of electromotors, torque applied to one or more hauling winches among the plurality of winches to achieve a target aircraft hauling speed;
      determine load on the aircraft based on the torque applied to the one or more hauling winches and torque applied to one or more rendering winches among the plurality of winches;
      determine, based on the detected load, target rendering torques for each of the one or more rendering winches that maintain the detected load below an aircraft maximum load limit and that maintain a predetermined tension in the cables corresponding to the one or more rendering winches;
      vary, by the plurality of electromotors, speed of the rendering winches to achieve the target rendering torques for each of the rendering winches; and
      vary, by the plurality of electromotors, torque of the rendering winches to maintain the predetermined tension.

2. The system of claim 1, wherein the control system is further configured to determine the torque applied to the one or more hauling winches and the torque applied to the one or more rendering winches based on winding temperature, motor speed and drawn current of each respective winch.

3. The system of claim 2, wherein the control system is further configured to determine tension in the cables corresponding to the one or more rendering winches based on the determined torque and wire layer height of each respective rendering winch.

4. The system of claim 3, wherein the control system is further configured to determine wire layer height based on a spooled wire length of each respective rendering winch.

5. The system of claim 1, further comprising a control console through which the target aircraft hauling speed is entered into the system by a user.

* * * * *